US009594773B2

(12) United States Patent
Herron

(10) Patent No.: US 9,594,773 B2
(45) Date of Patent: Mar. 14, 2017

(54) PATTERN-RETAINING METHOD FOR DISPLAYING LARGE VOLUMES OF GEOGRAPHIC BASED DATA USING STATISTICAL DEPOPULATION

(71) Applicant: Vesmir Inc., Broomfield, CO (US)

(72) Inventor: Dylan Scott Herron, Arvada, CO (US)

(73) Assignee: Vesmir, Inc., Broomfield, CO (US)

( * ) Notice: Subject to any disclaimer, the term of this patent is extended or adjusted under 35 U.S.C. 154(b) by 333 days.

(21) Appl. No.: 14/283,047

(22) Filed: May 20, 2014

(65) Prior Publication Data

US 2015/0339320 A1    Nov. 26, 2015

(51) Int. Cl.
*G06F 17/30* (2006.01)

(52) U.S. Cl.
CPC .. *G06F 17/30241* (2013.01); *G06F 17/30994* (2013.01)

(58) Field of Classification Search
CPC ............. G06F 17/30241; G06F 17/30994
USPC ........................................... 707/722
See application file for complete search history.

(56) References Cited

U.S. PATENT DOCUMENTS

| | | | |
|---|---|---|---|
| 6,208,347 B1 * | 3/2001 | Migdal | ............... G06T 17/20 345/419 |
| 6,405,129 B1 | 6/2002 | Yokota | |
| 6,865,483 B1 | 3/2005 | Cook et al. | |
| 7,076,741 B2 | 7/2006 | Miyaki | |
| 7,082,365 B2 | 7/2006 | Sheha et al. | |
| 7,272,489 B2 | 9/2007 | Tu | |
| 7,321,826 B2 | 1/2008 | Sheha et al. | |
| 7,388,519 B1 | 6/2008 | Kreft | |
| 7,551,182 B2 | 6/2009 | Bethune et al. | |
| 7,616,217 B2 | 11/2009 | Dayan et al. | |
| 7,839,421 B2 | 11/2010 | Bethune et al. | |
| 8,014,939 B2 | 9/2011 | Sheha et al. | |
| 8,037,166 B2 | 10/2011 | Seefeld et al. | |
| 8,095,434 B1 * | 1/2012 | Puttick | ............. G06F 17/30241 705/26.9 |
| 8,130,245 B2 | 3/2012 | Ham et al. | |
| 8,165,808 B2 | 4/2012 | Scheibe | |
| 8,301,371 B2 | 10/2012 | Sheha et al. | |
| 8,315,791 B2 | 11/2012 | Bales et al. | |
| 8,339,399 B2 | 12/2012 | Snow | |
| 8,363,068 B1 | 1/2013 | Miller et al. | |

(Continued)

OTHER PUBLICATIONS

Geoserver KML regionation.pdf.

*Primary Examiner* — Jean M Corrielus
(74) *Attorney, Agent, or Firm* — Michael D. Reilly

(57) ABSTRACT

Disclosed herein are various embodiments of a method for graphically displaying large volumes of data points on a display in an intuitive and readily understandable manner using statistical depopulation by defining multiple regionation levels using a combination of location based data and density based data with a random selection process to add more data points as more detail is requested while retaining the same overall pattern as when all points are displayed. Also disclosed are various embodiments for using the geographic bounds of a screen display to determine the appropriate level of data to display. The embodiments described ensure that the user is not overwhelmed by too much data on screen for areas with multiple data points, while ensuring that areas with few data points are also represented on the display.

18 Claims, 5 Drawing Sheets

(56) References Cited

U.S. PATENT DOCUMENTS

| | | |
|---|---|---|
| 8,423,902 B2 | 4/2013 | Lin et al. |
| 8,490,025 B2 | 7/2013 | Jakobson et al. |
| 8,504,945 B2 | 8/2013 | Jakobson et al. |
| 8,542,561 B1 * | 9/2013 | Oberg ................. G11B 19/044 369/47.33 |
| 8,560,228 B2 | 10/2013 | Feldbauer |
| 8,583,638 B2 | 11/2013 | Donelli |
| 8,600,619 B2 | 12/2013 | Bales et al. |
| 8,612,563 B2 * | 12/2013 | Seefeld ............. G06F 17/30241 707/754 |
| 8,667,424 B2 | 3/2014 | Macfarlane et al. |
| 8,671,355 B2 | 3/2014 | Pegg et al. |
| 8,713,004 B1 | 4/2014 | Hands et al. |
| 2004/0030592 A1 * | 2/2004 | Buck ...................... G06Q 10/06 705/7.31 |
| 2009/0100363 A1 * | 4/2009 | Pegg ................... G06F 3/04817 715/765 |
| 2012/0017168 A1 * | 1/2012 | Mason ................ G06F 3/04817 715/781 |
| 2012/0046861 A1 * | 2/2012 | Feldbauer ............ G09B 29/106 701/426 |
| 2012/0209861 A1 | 8/2012 | Narasimha et al. |
| 2014/0059060 A1 | 2/2014 | Yang et al. |
| 2016/0349939 A1 * | 12/2016 | Simpson ........... G06F 17/30277 |

\* cited by examiner

FIG. 2

| Region Level | Target Size (target number of points) | Points From $S_P$ | Points Still In $S_P$ | Points From $S_D$ | Points in region level | Points Still In $S_D$ |
|---|---|---|---|---|---|---|
| 1 | 1,000 | 1,000 | 500 | 0 | 1,000 | 7,998,500 |
| 2 | 2,000 | 1,500 | 0 | 500 | 2,000 | 7,998,000 |
| 3 | 4,000 | 1,500 | 0 | 2,500 | 4,000 | 7,996,000 |
| 4 | 8,000 | 1,500 | 0 | 6,500 | 8,000 | 7,992,000 |
| 5 | 16,000 | 1,500 | 0 | 14,500 | 16,000 | 7,984,000 |
| 6 | 32,000 | 1,500 | 0 | 30,500 | 32,000 | 7,968,000 |
| 7 | 64,000 | 1,500 | 0 | 62,500 | 64,000 | 7,936,000 |
| 8 | 128,000 | 1,500 | 0 | 126,500 | 128,000 | 7,872,000 |
| 9 | 256,000 | 1,500 | 0 | 254,500 | 256,000 | 7,744,000 |
| 10 | 512,000 | 1,500 | 0 | 510,500 | 512,000 | 7,488,000 |
| 11 | 1,024,000 | 1,500 | 0 | 1,022,500 | 1,024,000 | 6,976,000 |
| 12 | 2,048,000 | 1,500 | 0 | 2,046,500 | 2,048,000 | 5,952,000 |
| 13 | 4,096,000 | 1,500 | 0 | 4,094,500 | 4,096,000 | 3,904,000 |
| 14 | 8,192,000 | 1,500 | 0 | 7,998,500 | 8,000,000 | 0 |

FIG. 4

| Region Level | Region Size | Points inside Search Bounds |
|---:|---:|---:|
| 1 | 1,000 | 200 |
| 2 | 2,000 | 1,510 |
| 3 | 4,000 | 3,425 |
| 4 | 8,000 | 6,501 |

PATTERN-RETAINING METHOD FOR DISPLAYING LARGE VOLUMES OF GEOGRAPHIC BASED DATA USING STATISTICAL DEPOPULATION

FIELD

Various embodiments described herein relate to methods and techniques for graphically displaying location-based information. More specifically and without limitation these embodiments relate to methods and systems for representing large volumes of geographic data points on a display in an intuitive and readily understandable manner using statistical depopulation.

BACKGROUND

In the past few years computing power and data storage capacity have both grown by orders of magnitude. It is now both possible and relatively inexpensive to store huge quantities of data. However, there is a downside to this progress. The problem now facing the software developer or programmer is how to make this data available to the user in a way that conveys information and at the same time avoids data overload. The first step in this process is to retrieve only the data that the user wants or needs. The second step is to present the retrieved data, usually on a computer screen, in a format that minimizes visual overload and confusion. The methods and embodiments described herein address this second step. In particular, these methods and embodiments address the issue of displaying data with a geographic component, conveying the locations, pattern, density and distribution of data points in a readily understandable and clear manner.

Much of the data being stored today has a geographic component. While the data itself is of value, it is more valuable when associated with a specific location, often expressed in terms of latitude and longitude. In its simplest form, an example of this type of data might be the location of coffee shops within a city. A list of the coffee shops only becomes useful when associated with street addresses. Even more useful is a map of the city showing the locations of these coffee shops. Yet more information can be extracted from this data if the locations of the coffee shops are ranked by proximity to the user. Ultimately, the most useful form of display for the user is a map with the user's location at the center, surrounded by the closest coffee shops.

Even an example as simple as this illustrates the problems facing the software developer. If a user searches for restaurants in Lake City, Colo., fewer than 10 results will be returned. These can easily be displayed on a screen, even on a small screen such as a smartphone. But if the user searches for restaurants in the Denver metropolitan area, around 3,000 results will be returned. If all of these data points are displayed on a small screen, all the user sees is icons, with the underlying map being completely hidden. One solution to this problem is that adopted by Microsoft Streets and Trips in its personal computer version. While it lists the results on the side of the screen, it displays no icons at all until the user has zoomed in to a level where the individual streets are visible. This ensures that there will be minimal overlap between the icons on the screen. This is an elegant solution for the users of a program such as Microsoft Streets and Trips, which is intended to be used to find local points of interest, or plan a trip. It is not as useful for data analysis. For example it would not be possible to determine the distribution of Italian restaurants within a specific state using such a program, because a screen showing the entire state would not show local streets, and thus would not display any icons.

A different approach is taken by Craigslist, the popular user-to-user e-Commerce web site. When the map display option is selected for a particular category of item for sale, there may be many such items within the area visible on the screen. The program handles this by clustering items within limited geographic areas. Each cluster is represented by a circle with a number in it, indicating the number of items in the cluster. The size of the cluster varies according to the number of items, although the size is not proportional to the number of items. As the user zooms in, the clusters split into smaller clusters representing smaller geographic areas. As the user zooms out, the clusters merge into larger clusters representing large geographic areas. A feature of this approach is that even a single item on its own in a remote geographic area will show up on the map, while other clusters may represent thousands of items for sale in a major metropolitan area. This avoids a common problem of remote low density data points vanishing from the display as the user zooms out, at least until the geographic area covered by a cluster becomes large enough that it absorbs the outlying data points. These data points do not disappear entirely, in that they are added to the number of data points within the cluster, but the information about the distribution of these data points is lost at the higher zoom levels.

In some instances, the data points represent different physical objects. The different types of object may be represented by different icons on the screen. There still remains the problem of visual clutter when too many icons are displayed close together. For one attempt to resolve this problem see U.S. Pat. No. 6,405,129 to Yokata entitled "Method of Displaying POI Icons for Navigation Apparatus". This describes displaying the most common icons first, and then overlaying them with the less common icons. The result is, for example, that a single ATM will not be hidden by a cluster of restaurants. However, this approach is not helpful when all of the data points represent the same type of data, and it still does not resolve the problem of visual clutter.

For another approach that attempts to display fewer data points see U.S. Pat. No. 6,8654,832 to Cook et al., entitled "Method and Apparatus for Providing a Topology View Based on Heuristic Information Density". This technique assigns a weighted importance to each point of interest. The weighted importance of each point of interest is summed and compared against a predefined target value. If the summed weight substantially equals the target value, the corresponding points of interest are displayed. The obvious drawback to approaches such as this is the need to come up with a technique for assigning the weighted importance to each data point. It is quite possible, depending on what the user is looking for, that the importance of each data point may vary substantially. This adds a great deal of complexity to the process. It is also possible that the weighting process itself may introduce patterns to the data, while masking the real underlying patterns within the data set.

Other approaches have used one icon to represent many data points. For an example of this, see U.S. Pat. No. 7,076,741 to Miyaki entitled "Point-of-interest icon and point-of-interest mark display method". In this approach, when a search returns a large number of point of interest (POI) icons with high geographic density, one representative icon is displayed instead of the individual POI icons. The summary of this patent even states "a first object of the present invention is to make it easy to see roads on a map by reducing the number of POI icons displayed on the map", acknowledging the problem that when too many icons are displayed on a map, they may even obscure the underlying map. However, the process of deciding when too many icons are displayed and the complexity of selecting the size and location of a representative icon are fraught with difficulty. Perhaps the Craigslist technique described above comes closest to achieving a useful product using a variation of this approach.

For an approach that integrates the user position into the decision making process, see U.S. Pat. No. 7,272,489 to Tu entitled "Navigation method and system for extracting, sorting and displaying POI information". This approach is especially well-suited to displaying data on personal navigation systems, GPS devices and cell phones. It sorts the points of interest into multiple levels based on distance from the current user position. As the user zooms in or out, data points from different levels are added to or removed from the screen of the device, depending on the geographic area visible on the screen. However, no attempt is made to limit the number of data points displayed. This method is quite acceptable when dealing with local data geographically close to the user, which limits the number of available data points. It has the drawback that as the user moves, as would be expected when the user is looking at a personal navigation system, the icons have to be constantly assigned to different levels as the distance to each point of interest changes. Further, it does not work well for large geographic areas containing large numbers of data points.

For a method that discriminates between data points using the relevance of a data point to the user's query, see U.S. Pat. No. 8,037,166 to Seefeld, et al., entitled "System and Method of Displaying Search Results Based on Density". The problems inherent in this approach include the complexity of determining the relevance of a data point, and the possibility that the user will not be able to determine the relevance of a data point until the user can actually examine that data point on the map.

With the availability of large and relatively inexpensive computer display screens and large scale color printers, it would seem reasonable to consider the use of color to address the problem of displaying clusters of data points. For example of this approach see U.S. Pat. No. 8,165,808 to Bernard Scheibe, entitled "Techniques for Representing Location Information". Described therein is a technique for replacing clusters of data points with colors of varying densities and hues. As the user zooms in to a smaller geographic area with a few data points, the display changes to show the actual data points. This approach has several drawbacks. The colors may obscure details in the underlying map data, especially if the underlying map itself makes use of color to denote political boundaries, geologic formations, population densities, etc. The data colors and the map colors may combine to produce unintended and confusing results. When using color to denote values on a display, research has shown that unless the colors are chosen very carefully, the eye may be preferentially drawn to certain areas that are not necessarily particularly significant in terms of the data they represent. Further, the change from the color density display to the display of actual data points is jarring for the user as he or she zooms in and out. There also exists the problem of how to handle a display in which some regions have high density data areas and other regions have a low density of data. Displaying some data in color and some data as icons may be confusing to the user.

For a different clustering approach, see U.S. Pat. No. 8,3393,992 to Bradford Snow entitled "Declustering point of interest icons". The approach described in this patent uses clustering to display data points when there are a large number of overlapping data points. It uses "superclusters" and "mini-clusters", producing the effect of clusters within clusters. It attempts to display individual point of interest icons by placing them on the display, and when they overlap, spreading them out with pointers drawn from the individual icons to the center of the cluster. This does reduce the overlap of the points of interest, but it has the disadvantage of displaying icons removed from their true geographic locations. The data represented by many of these icons is neither at the position shown nor at the center of the cluster as suggested by the pointer. It may also add to the visual confusion because of the lines drawn from the icons to the centers of the clusters. While this approach may work for some applications, perhaps with a limited number of icons, it is not appropriate for the display and analysis of large volumes of data.

Several methods have been proposed for associating data points with zoom levels. See, for example, U.S. Pat. No. 8,490,025 to Jakobson, et al., entitled "Displaying content associated with electronic mapping systems", and U.S. Pat. No. 8,504,945 to Jakobson, et al., entitled "Method and system for associating content with map zoom function". The main purpose of these methods is to provide data rapidly and efficiently to small handheld devices. Different data sets are associated with different zoom levels at a server, and are then provided quickly to the user's device as he or she zooms in and out. No attempt is made to address the issue of too many icons being displayed on-screen.

Another approach for controlling the number of icons displayed depending on the zoom level is described in U.S. Pat. No. 8,600,619 to Bales et al., entitled "Method and apparatus for providing smart zooming of a geographic representation". This patent describes how "the custom zooming application determines respective degrees of relevance of the plurality of objects based, at least in part, on the device, a user of the device, related context information, or a combination thereof". Again this introduces a level of complexity and the need for decision-making as to exactly what data may be considered relevant. This technique may work adequately for small sets of fairly similar data, but may not be as useful for very large sets of disparate data.

Similar approaches are seen in U.S. Pat. No. 8,612,563 to Seefeld, et al., entitled "System and method of displaying search results based on density", and U.S. Pat. No. 8,713,004 to Hands et al., entitled "Method and system for prioritizing points of interest for display in a map using category score".

Some of the approaches in which data points are allocated to different layers or levels containing different numbers of data points, and the different levels displayed as the user zooms in and out, are referred to as "regionation". As has been described above, some of these approaches tend towards complexity and require decisions to be made either by the software developer or by the end-user, sometimes even before the data has been fully analyzed to allow these decisions to be made properly. A better approach would be one that requires little input from the user, beyond specifying the criteria for the data retrieval, and perhaps the maximum number of data points to be displayed on the screen.

Such an approach has been adopted by the open source Geoserver software, which attempts to use what it describes as random techniques to assign data points to different levels. Unfortunately the so-called "random" approach involves nothing more than using the existing order of the data. This is highly unlikely to be random, especially with large data sets which have been bulk loaded, perhaps one geographic area at a time, or data owned by several companies, with data from one company loaded before that of another. Further, the software developer or the end-user may have placed an "order by" clause in the query used to retrieve the data and thus the order will be anything but random.

What is needed is a way to place the data in a cache with data points assigned to different regionation levels, using a truly random approach, while retaining the pattern of data points found in the a retrieved data set. Data from the cache is displayed from an appropriate regionation level as the user pans and zooms. As will be known to one of ordinary skill in the art, achieving a truly random approach, or even a close approximation, is not a trivial undertaking. Further, some modifications may be necessary to this approach to ensure that isolated data points remote from large clusters of data are still displayed, even when the user zooms out from the display.

SUMMARY

In one embodiment there is provided a pattern-retaining method for allocating large volumes of geographic data points to regionation level data sets for providing displays of data points at user controlled zoom levels that are representative of the data distribution and density comprising: determining the desired number of data cells; retrieving a requested data set; randomly selecting from the requested data set one data point from each cell that contains at least one data point to represent that cell and placing the selected data points in location handled data set $S_P$; removing the data points in location handled data set $S_P$ from the requested data set; placing the remaining data points from the requested data set in density handled data set $S_D$ data points from location handled data set $S_P$ and density handled data set $S_D$ to regionation levels using a random selection process which further comprises: creating a table of N regionation levels and specifying the number of data points to be placed in each regionation level and; creating regionation levels 1 through N by repeating the following steps:
  i. for any regionation level n where n is greater than 1, placing all the data points from the regionation level (n−1) into regionation level n;
  ii. if any data points remain in location handled data set $S_P$, moving randomly chosen data points from location handled data set $S_P$ to regionation level n until the specified number of data points for regionation level n is reached, or no more data points are available in location handled data set $S_P$;
  iii. if more data points are required to reach the specified number of data points in regionation level n, moving randomly chosen points from density handled data set $S_D$ to regionation level n until the specified number of data points for regionation level n is reached, or the process of adding data is terminated.

In another embodiment there is provided a pattern-retaining method for displaying large volumes of geographic data points on a map providing displays at user controlled zoom levels that are representative of the data distribution and density using regionation data sets comprising: retrieving a requested data set; allocating data points from the requested data set to a series of regionation levels by;
  (a) randomly selecting from the requested data set one data point from each cell that contains at least one data point to represent that cell and placing the selected data points in location handled data set $S_P$;
  (b) removing the data points in location handled data set $S_P$ from the requested data set;
  (c) placing the remaining data points from the requested data set in density handled data set $S_D$;
  (d) creating a table of N regionation levels and specifying the number of data points to be placed in each regionation level
  (e) creating regionation levels 1 through N by repeating the following steps;
    i. for any regionation level n where n is greater than 1, placing all the data points from the regionation level (n−1) into regionation level n;
    ii. if any data points remain in location handled data set $S_P$, moving randomly chosen data points from location handled data set $S_P$ to regionation level n until the specified number of data points for regionation level n is reached, or no more data points are available in location handled data set $S_P$;
    iii. if more data points are required to reach the specified number of data points in regionation level n, moving randomly chosen points from density handled data set $S_D$ to regionation level n until the specified number of data points for regionation level n is reached, or the process of adding data is terminated;
specifying the maximum number of data points to be displayed on screen; determining the bounds of the geographic area displayed on screen; determining the number of data points in each regionation level that fall within the bounds of the geographic area displayed on screen; determining the regionation level N with the maximum number of data points that fall within the bounds of the geographic area displayed on screen wherein the number of data points in the regionation level is less than the specified the maximum number of data points to be displayed on screen; displaying the data points in regionation level N on the screen and adjusting the geographic bounds and the corresponding regionation level and displaying the corresponding data from the appropriate regionation level as the user pans and zooms the screen display.

In yet another embodiment there is provided a pattern-retaining method for displaying large volumes of geographic data points on a map providing displays at user controlled zoom levels that are representative of the data distribution and density using regionation data sets comprising: determining the desired number of data cells; retrieving a requested data set; randomly selecting from the requested data set one data point from each cell that contains at least one data point to represent that cell and placing the selected data points in location handled data set $S_P$; removing the data points in location handled data set $S_P$ from the requested data set; placing the remaining data points from the requested data set in density handled data set $S_D$; allocating data points from location handled data set $S_P$ and density handled data set $S_D$ to regionation levels using a random selection process; specifying the maximum number of data points to be displayed on screen; determining the bounds of the geographic area displayed on screen; determining the number of data points in each regionation level that fall within the bounds of the geographic area displayed on screen; determining the regionation level N with the maximum number of data points that fall within the bounds of the geographic area displayed on screen wherein the number of data points in the regionation level is less than the specified the maximum number of data points to be displayed on screen; displaying the data points in regionation level N on the screen and adjusting the geographic bounds and the corresponding regionation level and displaying the corresponding data from the appropriate regionation level as the user pans and zooms the screen display.

Further embodiments are disclosed herein or will become apparent to those skilled in the art after having read and understood the specification and drawings hereof. This summary may be more fully appreciated with respect to the following description and accompanying figures and attachments.

BRIEF DESCRIPTION OF THE DRAWINGS

Different aspects of the various embodiments of the invention will become apparent from the following specification, drawings and claims in which:

FIG. 2 is a table showing a numeric example of regionation;

FIG. 4 is a table showing a numeric example of how regionated data is displayed and FIG. 5 is a simplified visual example of regionation.

The drawings are not necessarily to scale. Like numbers refer to like parts or steps throughout the drawings.

DETAILED DESCRIPTION OF SOME EMBODIMENTS

Figure 1:
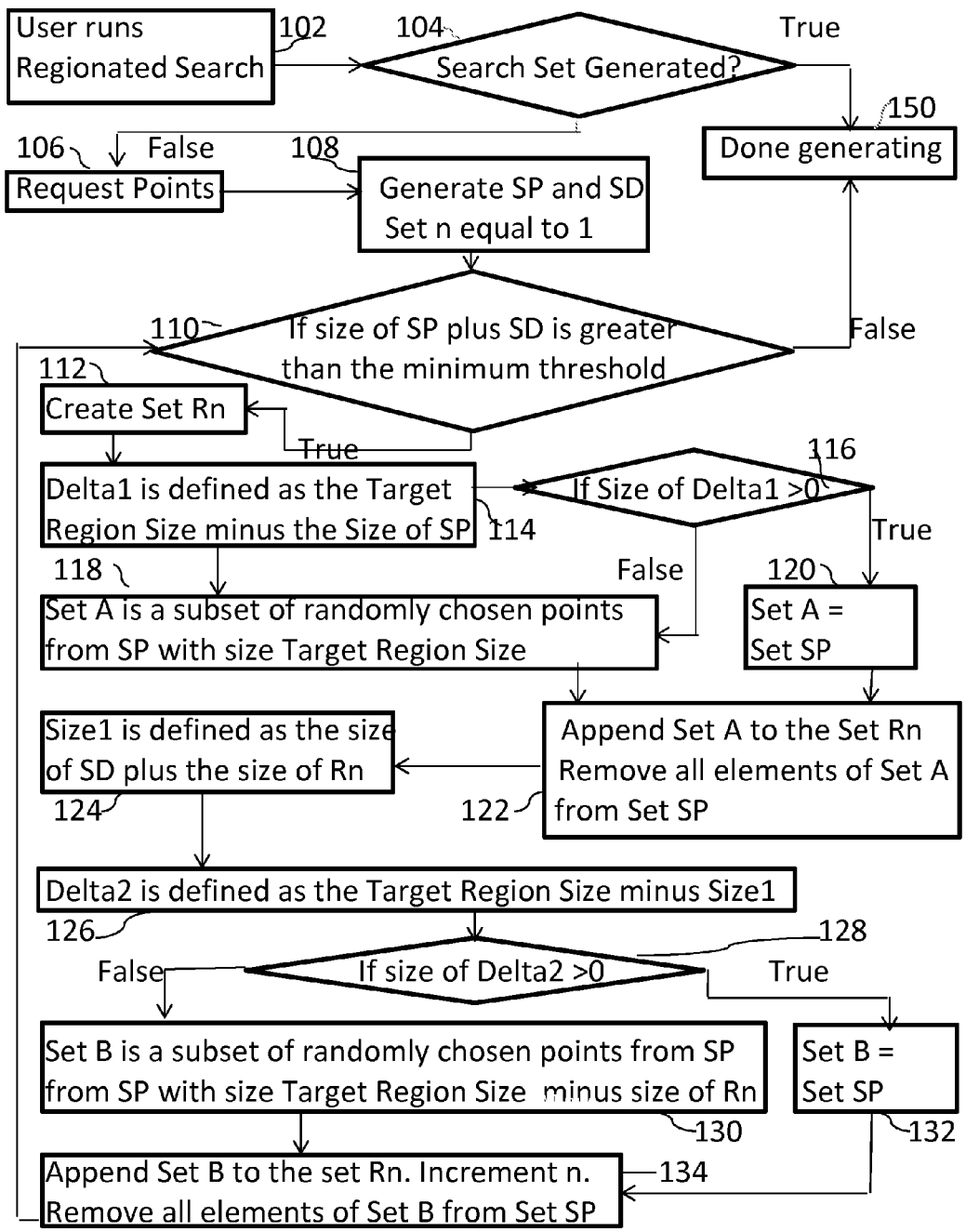
FIG. 1 is a flow chart showing how a data set is assigned to regionation levels.

Before proceeding with the detailed description, it is to be appreciated that the present teaching is by way of example only, not by limitation.

In the following description, specific details are provided to impart a thorough understanding of the various embodiments of the invention. Upon having read and understood the specification, claims and drawings hereof, however, those skilled in the art will understand that some embodiments of the invention may be practiced without hewing to some of the specific details set forth herein. Moreover, to avoid obscuring the invention, some well-known methods, processes and devices and systems finding application in the various embodiments described herein are not disclosed in detail. Persons having ordinary skill in the art will recognize that there may be many implementation-specific details that are not described here, but that would be considered part of a routine undertaking to implement the inventive concepts of the present invention.

In particular, the basic techniques and methods for displaying location-based data on a computer screen, including panning and zooming, and tracking both the areal extent of the data to be displayed and the position of the cursor on the screen will be well understood by one of ordinary skill in the art.

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multiple computer processors, hand-held devices, programmable consumer electronics, mini-computers, mainframe computers, and the like. The invention may also be practiced in distributed computing environments where tasks are performed by servers or other processing devices that are linked through a one or more data communications network. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

The processes described herein can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory.

Several embodiments of the present invention are discussed below. The appended drawings illustrate only typical embodiments of the present invention and therefore are not to be considered limiting of its scope and breadth. In the drawings, some, but not all, possible embodiments are illustrated, and further may not be shown to scale.

FIG. 1 illustrates as a flow chart one embodiment of a method by which data sets are retrieved and compiled into regionation data sets. The user specifies certain criteria which are used to retrieve a set of data from the database or other data source at 102. The process checks to see if the result dataset already exists at 104. If it does, then the data generation step is complete at 150. If not, then the requested data must be retrieved by running a query based on the user's criteria against the database or retrieving the data from some other means of electronic data storage. Although these embodiments refer to retrieving data from a database, it will be understood by one of ordinary skill in the art after reading this description that data may be retrieved from other sources, including but not limited to text files, spreadsheets, CSV (Comma Separated Value) files, or any other form of data with an associated or embedded geographic location. At this point in the process the criteria include data attributes, but do not include restrictions by specific geographic location.

In order to allocate data points to regionation level data sets, either the number levels and the number of required points in each regionation level data set must be predetermined, or an algorithm used to compute the number of points in each regionation level data set, with some termination step to determine how many levels are created, or some maximum permitted number of levels is reached. One method involves the number of data points doubling with each level. Another option might be a logarithmic distribution, with each level containing ten times the number of points as the preceding level. Other methods of predetermining or computing the number of points in each regionation level data set will be apparent to one of ordinary skill in the art after reading this description and studying the figures.

From the retrieved data set, two data sets are created. The geographic area encompassed by the data set is divided into a predetermined number of cells. A regionation algorithm randomly selects one data point from each cell to represent the data points within that cell. The first data set, data set $S_P$, is the collection of these data points. Such data points are referred to as the location handled data points. Statistically, by randomly selecting a data point from within a cell, the average data point will be selected. For example, in an area with oil or gas wells, if there are mostly horizontal wells, with high probability the selected well will be a horizontal well, and more horizontal wells will be selected overall. This approach is used to speed up the first search, rather than attempting to find a well with the absolute most common attributes.

Previous approaches have attempted to define criteria for selecting or even creating data points to represent cells. These approaches tend to be complex, because what is a typical or representative data point in one cell may not be representative or even present in another cell. Defining one type of data point as representative of all cells can produce very misleading results when the cells may contain multiple types of data. Attempting to establish criteria to determine in what manner the data point represents all of the data points within a cell may be problematic. The present embodiment avoids this complexity by simply selecting one data point at random within the cell. Statistically, when there are multiple data points in a cell, the selected data point will be of the most common type within that cell. Although this may not be true 100% of the time, it will be true more often than not if the data points have some underlying similarity. In the case where there really is no representative or typical data point within a cell, displaying a randomly chosen data point is a reasonable option. The purpose of selecting the location handled data set is to ensure that every cell that contains a data point will be represented by a point in this data set, without implying that the selected point is typical or representative in any way other than by the laws of statistics.

All of the data points in the retrieved data set which were not placed in data set $S_P$ are placed in a second data set, data set $S_D$. These data points are referred to as the density handled data points.

The advantage of these embodiments is that there will always be a data point available for display in every cell that contains at least one data point. As the user zooms in, focusing on a smaller geographic area, more data points will be displayed on-screen. As more data points are added to the display, those data points from cells containing only one data point will be displayed before adding additional data points in cells containing multiple data points.

Still referring to FIG. 1, at 110, if the total number of data points in data set $S_P$ plus the number of data points in data set $S_D$ does not reach a predetermined minimum threshold, then there is no need for regionation. The predetermined minimum threshold is the number of data points that can be displayed without visual confusion caused by overlapping data points and clustering of data points, or the number of data points that can be readily handled by a given device.

If the total number of data points in data set $S_P$ plus the number of data points in data set $S_D$ exceeds the predetermined minimum threshold, then there are more data points in the data set than the display can accommodate without some form of statistical depopulation. In the embodiments described herein, this is achieved by creating regionation data sets, wherein each regionation data set contains a predetermined number of data points, including all the data points from the preceding data set.

As shown in FIG. 1, the process of creating regionation sets begins by defining an empty data set $R_1$ at 112 for regionation level 1. A target region size, that is the number of desired data points, has been predetermined for regionation level I. A variable $Delta_1$ is defined as the target region size minus the size of data set $S_P$. At 116, if this value $Delta_1$ is greater than zero then there are more data points in data set $S_P$ than are required for data set $R_1$. At 118, data points are chosen randomly from data set $S_P$ to create Set A as a subset of data set $S_P$ with size equal to the target region size. At 122, the data points in Set A are added to data set $R_1$. Data set $R_1$ now contains the desired number of data points.

At 116, if the value $Delta_1$ is less than zero, then there are fewer data points in the data set $S_P$ than are desired for data set $R_1$. If the value $Delta_1$ is equal to zero, then there are exactly as many points in the data set $S_P$ as are desired for data set $R_1$. In either case, Set A is declared equal to the data set $S_P$, and Set A is appended to data set $R_1$ at 122.

Also at 122, all the data points placed in Set A are then removed from data set $S_P$.

At 124 a variable $Size_1$ is defined as the size of data set $S_D$ plus the size of data set $R_1$. At 126, variable $Delta_2$ is defined as the target region size minus $Size_1$. At 128, if $Delta_2$ is greater than zero, then more data points are available in data set $S_D$ than are required to meet the desired target region size. Data points are selected at 130, by selecting data points at random from data set $S_D$ to create Set B. If $Delta_2$ is less than or equal to zero, at 132, then data set $S_D$ contains fewer data points than needed to meet the target region size. Therefore all the available data points in data set $S_D$ are placed in Set B.

At 134, all the data points in Set B are appended to data set $R_1$. All the data points in Set B are removed from data set $S_D$. The value of n, the regionation level, is then set to 2.

The process than loops back to 110, where the number of unallocated data points, that is, the recomputed size of data set $S_P$ plus the recomputed size of data set $S_D$ is checked. This value is the same as the number of data points not in data set $R_1$. If the number of unallocated data points exceeds the predetermined threshold, more regionation levels are needed. The process of selecting data points is then repeated. First, Regionation level $R_2$ is created at 112 by adding all the data points already in regionation level $R_1$ to regionation level $R_2$. Steps 114 through 122 then extract remaining data points from data set $S_P$, if there are any, up to the desired number for Regionation level 2, using a random selection algorithm. As before, if the number of data points remaining in data set $S_P$ is less than the number needed for this regionation level, the random selection process is skipped and all the points in data set $S_P$ are moved to data set $R_2$ If more data points are needed to reach the target regionation size for region 2, they are allocated from data set $S_D$ using steps 124 through 134.

Steps 110-134 are repeated as necessary for more regionation levels until the predetermined threshold level is reached. Each regionation level thus contains all the points in the preceding regionation level plus additional points chosen using the random selection technique. Allocating data points to levels can be stopped when more than a predetermined percentage of the data points have been allocated. The next regionation level is then defined as containing all of the data points, and is the highest regionation level required for this data set. Alternatively, a predetermined threshold level may be set at some percentage of the number of data points remaining unallocated, with any data points remaining in data set $S_P$ or data set $S_D$ being allocated to a final regionation level. At 150, the regionation is complete.

In other embodiments, the allocation of data points to regionation levels may be terminated when a predetermined number of regionation levels has been created. In yet other embodiments, the allocation of data points to regionation levels may be terminated when a predetermined number of data points has been allocated to the regionation levels, with any data points remaining in data set $S_P$ or data set $S_D$ being allocated to a final regionation level.

An advantage of the embodiments described herein is that each regionation level contains all of the data points from each preceding regionation level. Therefore as the user zooms in to see more detail within a smaller geographic area, and data is displayed from different regionation levels, individual data points do not disappear from the screen, as they might if each regionation level were computed separately. This is especially important when the data points are added to each level using a random selection process.

Referring now to FIG. 2, shown here is a table representing a numeric example of regionation. The first step is that the server computer checks the cache for the search results. In this example, this is the first time the user has run the search, so no regionation cache exists yet.

In this example, the data search has found 8,000,000 data points that are all contained in the predetermined number of 1500 cells. Data set $S_P$, the location handled data points, is generated as described above. The regionation process randomly selects a data point from each cell that contains at least one data point to represent that cell as a whole. The example shown in FIG. 2 supposes that the first regionation level was specified as containing 1000 data points, the second 2000 data points, the third 4000 and so on, doubling the number of data points for each successive level. The process randomly selects 1000 data points from data set $S_P$, which become data points in data set $R_1$, the first regionation level.

As previously described, data set $S_D$ is the set of data points found using the density approach. Data set $S_D$ contains all of the data points that meet the search criteria that are not located in data set $S_P$. Because data set $S_P$ contains 1500 of 8,000,000 data points, initially data set $S_D$ will contain 7,998,500 data points. After the first level of regionation, 1000 data points have been moved from data set $S_P$ to data set $R_1$. Thus after the first level of regionation, data set $S_P$ contains 500 remaining data points, data set $S_D$ still contains 7,998,500 and regionation level $R_1$ contains 1,000 data points.

As stated above, the second regionation level data set $R_2$ contains all of the data points located in the first regionation level data set $R_1$, plus the required number of additional data points, thereby ensuring that that individual data points do not disappear as the user zooms in. The second regionation level thus must choose an additional 1000 data points. To do this, the server computer will first select all of the remaining 500 data points from the data set $S_P$ and then randomly select another 500 data points from data set $S_D$. Thus after the second level of regionation, data set $S_P$ contains no data points, data set $S_D$ contains 7,998,000 data points and regionation level $R_2$ contains 2,000 data points.

Still referring to FIG. 2, for regionation level data set $R_3$, another 2000 data points are required in addition to those previously selected. There are no remaining data points in data set $S_P$, and therefore all 2000 data points are randomly selected from data set $S_D$. This process is repeated for additional levels until it reaches regionation level $R_{13}$. There are 4,096,000 data points in regionation level $R_{13}$. When the process reaches regionation level $R_{14}$, an additional 4,096,000 data points are required, but there are only 3,904,000 data points available in data set $S_D$. Therefore all these data points are placed in regionation level $R_{14}$, together with the data points from regionation level $R_{13}$, and the process terminates.

In other embodiments, it is observed at regionation level $R_{13}$ that more than a predetermined percentage of the data points have been removed from data set $S_D$. Therefore all the data points in regionation level $R_{13}$ and all the remaining data points in data set $S_D$ are added to regionation level $R_{14}$, and the process terminates.

Figure 3:
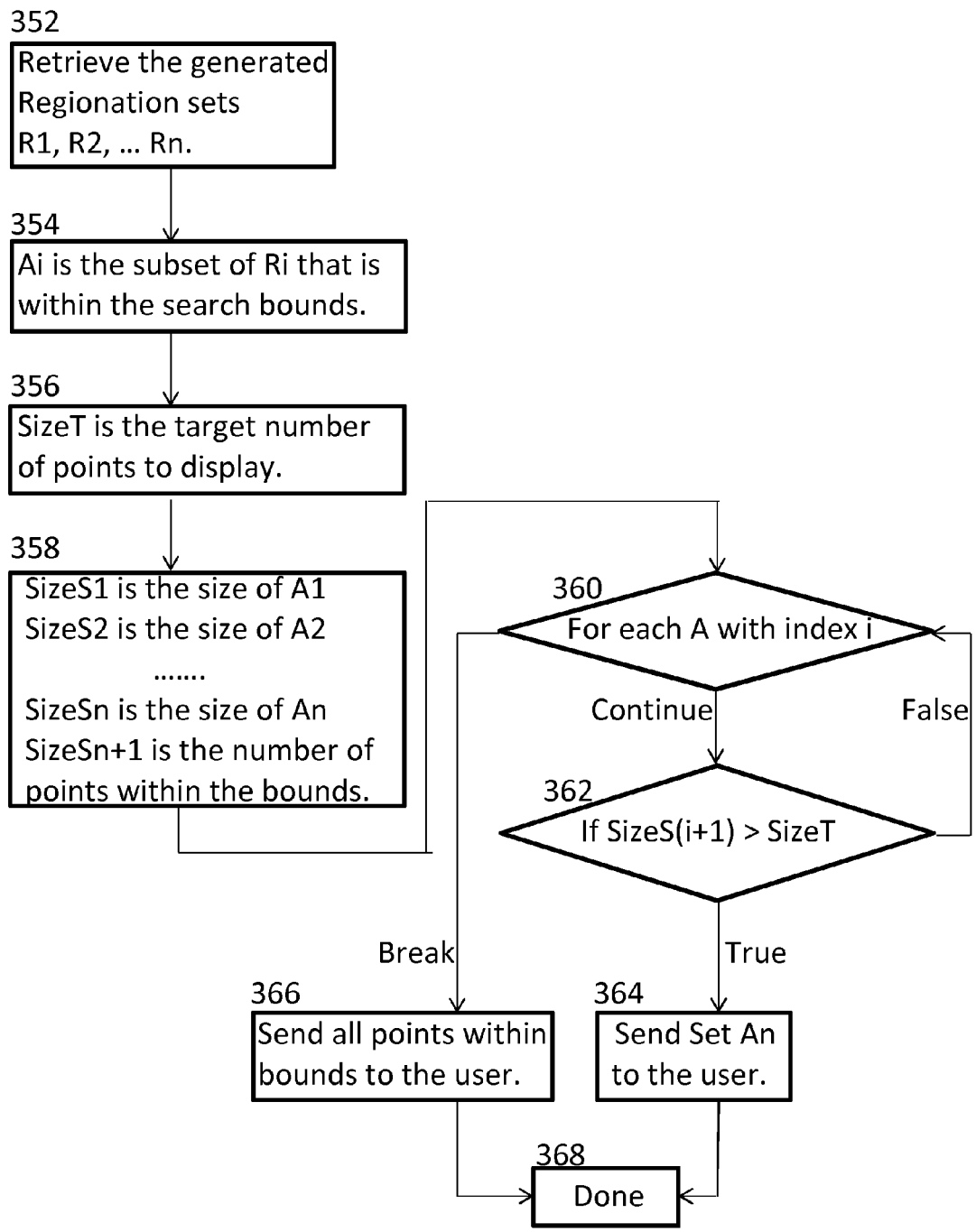
FIG. 3 is a flow chart showing how a data set is displayed as the user zooms in or out.

Whether the regionation data sets were previously created, or have just been created using the embodiments described above, the next step in the process is to display the data for the user. Referring now to FIG. 3, the regionation data sets are retrieved at 352.

At 354 the search bounds are defined as the geographic area visible on the user's display screen. For each regionation level data set $R_i$, subset $A_i$ is defined as the subset within data set $R_i$ that fall within the search bounds.

At 356, $Size_t$ is the target number of data points to display. The value of $Size_t$ in some embodiments is fixed based on screen size and resolution. Other criteria to set the number of data points to display will be apparent to one of ordinary skill in the art after reading this description and studying the figures. In some embodiments the number of data points to display may be specified by the user.

At 358 the number of data points, $Size_{si}$, of each subset within the search bounds, $A_i$, is determined.

At 360, the process searches each of the $Size_{si}$ values to find where the size of the subset $A_{(i+1)}$ exceeds the target size $Size_t$. The variable n is set to the value of i, and then subset $A_n$ is sent to the user. If the target number of data points to display exceeds the number of available data points in the highest regionation level, then all of the data points within the bounds are sent to the user.

This process is repeated for each different view as the user pans and scrolls, and zooms in and out, thereby changing the geographic area displayed on screen, and thus changing the search bounds.

FIG. 4 shows a numeric example of the embodiment described above in FIG. 3. The algorithm will first check for the search cache, that is, whether the regionation levels have been created and a search already run. If so, then the results of that search will exist in the search cache. If they do not, the regionation levels are created as described above, the search is run, and the results placed in the search cache. The algorithm will then determine what to display based upon the data in the search cache. This example assumes that the user is zoomed into a geographic area such that the number of data points in the search cache within this area at each level are as shown in FIG. 4.

In this example, it has been specified to never show more than 3,500 data points to the user. The numbers of data points that are within the search bounds are shown in the column "Points inside Search Bounds" in FIG. 4. The greatest number of data points, while remaining below the maximum desired of 3,500, is 3,425, which occurs in regionation level 3. Thus the bounded search of data points in regionation level 3 will be displayed on screen for the user.

Other embodiments may include an option for the user to specify that the search should return at least N data points to be displayed on screen. In these embodiments, using the above example, if the user requested at least 3,500 data points, the displayed data set would be the data set from regionation level 4 and would contain 6,501 data points.

As the user zooms in further, thereby limiting the geographic area displayed on screen, the number of data points within the search bounds will fall, and consequently higher regionation levels will be selected. The result is that as the user zooms in, the number of data points displayed will remain substantially constant, but the number of data points displayed within a given geographic area will grow. As described above, the visual effect is that more detail is being added, but the data points already shown do not jump around, because each regionation level contains all of the data points from all of the lower regionation levels. Therefore, as the user zooms in, no data points will disappear. This is a benefit of the present embodiments over other approaches which use aggregated icons, data clusters, or data points at statistical centers of data clusters, or select different representative data points at different depopulation levels.

As the user zooms in yet further, to a relatively small geographic area, at some zoom factor all of the data points available within that small area will be visible on the screen. Further zooming in will result in the displayed geographic area becoming smaller, and thus the number of visible data points will decrease, until in the limit, the user can zoom in to show only one data point on screen.

Figure 5:
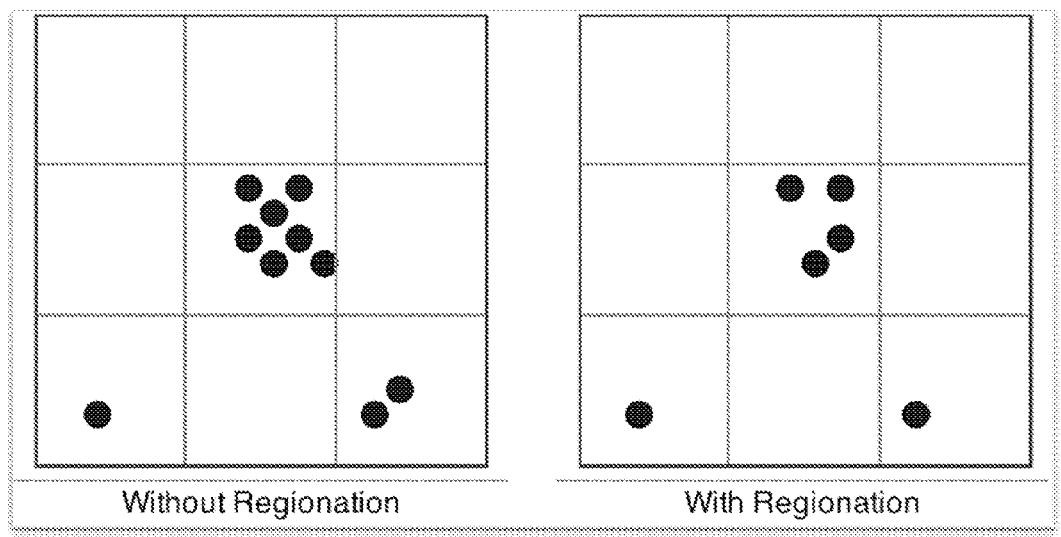

Referring now to FIG. 5, here are shown two examples of displays of geographic-based data, one without regionation applied and the other with regionation applied. The display with regionation shows fewer data points. It is important to note that while data points have been removed, at least one data point remains in every cell where data points exist. Further, the data points in the example with regionation are in the correct locations. The four data points in the center cell are in their correct locations, and no attempt has been made to represent the other data points from this center cell, such as creating a cluster or placing an icon at a statistical center of the data points.

Still referring to FIG. 5, only three of the nine cells contain data points. Therefore one can deduce that the data set $S_P$, the location handled data points, contains three data points. The additional three data points in the regionation example must therefore be have been chosen randomly from the density handled data points in data set $S_D$. It is not surprising that these values show up in the center cell, because as one can see from the example without regionation, there are clearly more data points in the center cell than anywhere else. Even with as few as six data points, the regionation example is already starting to reflect the density and distribution of the data points. Although this simple example takes ten locations and reduces them to six, it will be understood that the same principles apply when there are several thousand data points be displayed on screen in a visually clear and understandable manner.

A limited number of embodiments have been described herein. Those skilled in the art will recognize other embodiments within the scope of the claims of the present invention.

It is noted that many of the structures, materials, and acts recited herein can be recited as means for performing a function or step for performing a function. Therefore, it should be understood that such language is entitled to cover all such structures, materials, or acts disclosed within this specification and their equivalents, including any matter incorporated by reference.

It is thought that the apparatuses and methods of embodiments described herein will be understood from this specification. While the above description is a complete description of specific embodiments, the above description should not be taken as limiting the scope of the patent as defined by the claims.

Other aspects, advantages, and modifications will be apparent to those of ordinary skill in the art to which the claims pertain. The elements and use of the above-described embodiments can be rearranged and combined in manners other than specifically described above, with any and all permutations within the scope of the disclosure.

Although the above description includes many specific examples, they should not be construed as limiting the scope of the method, but rather as merely providing illustrations of some of the many possible embodiments of this method. The scope of the method should be determined by the appended claims and their legal equivalents, and not by the examples given.

What is claimed is:

1. A pattern-retaining method for allocating large volumes of geographic data points to regionation level data sets for providing displays of data points at user controlled zoom levels that are representative of the data distribution and density comprising:
    determining the desired number of data cells;
    retrieving a requested data set;
    randomly selecting from the requested data set one data point from each cell that contains at least one data point to represent that cell and placing the selected data points in location handled data set $S_P$;
    removing the data points in location handled data set $S_P$ from the requested data set;
    placing the remaining data points from the requested data set in density handled data set $S_D$;
    allocating data points from location handled data set $S_P$ and density handled data set $S_D$ to regionation levels using a random selection process which further comprises:
    creating a table of N regionation levels and specifying the number of data points to be placed in each regionation level and;
    creating regionation levels 1 through N by repeating the following steps:
        i. for any regionation level n where n is greater than 1, placing all the data points from the regionation level (n−1) into regionation level n;
        ii. if any data points remain in location handled data set $S_P$, moving randomly chosen data points from location handled data set $S_P$ to regionation level n until the specified number of data points for regionation level n is reached, or no more data points are available in location handled data set $S_P$;
        iii. if more data points are required to reach the specified number of data points in regionation level n, moving randomly chosen points from density handled data set $S_D$ to regionation level n until the specified number of data points for regionation level n is reached, or the process of adding data is terminated.

2. The method of claim 1 wherein the process of adding data is terminated when no more data points remain in density handled data set $S_D$, and the maximum regionation level N is set to the current value of n.

3. The method of claim 1 wherein the process of adding data is terminated when the number of data points remaining in density handled data set $S_D$ is less than a predetermined percentage of the number of data points required in the next regionation level, all of those data points are moved to the next regionation level (n+1), and the maximum regionation level N is set to the current value of (n+1).

4. The method of claim 1 wherein allocating data points from location handled data set $S_P$ and density handled data set $S_D$ to regionation levels using a random selection process further comprises:

using an algorithm to specify the number of data points to be placed in each regionation level and creating regionation levels 1 through N by repeating the following steps;
i. for any regionation level n where n is greater than 1, placing all the data points from the regionation level (n−1) into regionation level n;
ii. if any data points remain in location handled data set $S_P$, moving randomly chosen data points from location handled data set $S_P$ to regionation level n until the specified number of data points for regionation level n is reached, or no more data points are available in location handled data set $S_P$;
iii. if more data points are required to reach the specified number of data points in regionation level n, moving randomly chosen data points from density handled data set $S_D$ to regionation level n until the specified number of data points for regionation level n is reached, or the process of adding data is terminated.

5. The method of claim 4 wherein the process of adding data is terminated when no more data points remain in density handled data set $S_D$, and the maximum regionation level N is set to the current value of N.

6. The method of claim 4 wherein the process of adding data is terminated when the number of data points remaining in density handled data set $S_D$ is less than a predetermined percentage of the number of data points required in the next regionation level, all of those data points are moved to the next regionation level (n+1), and the maximum regionation level N is set to (n+1).

7. The method of claim 4 wherein the algorithm to specify the number of data points to be placed in each regionation level is that the number of data points in any regionation level greater than level 1 is double the number of data points in the previous regionation level.

8. The method of claim 4 wherein the algorithm to specify the number of data points to be placed in each regionation level is that the number of data points in any regionation level greater than level 1 is ten times the number of data points in the previous regionation level.

9. A pattern-retaining method for displaying large volumes of geographic data points on a map providing displays at user controlled zoom levels that are representative of the data distribution and density using regionation data sets comprising:

retrieving a requested data set;
allocating data points from the requested data set to a series of regionation levels by;
(a) randomly selecting from the requested data set one data point from each cell that contains at least one data point to represent that cell and placing the selected data points in location handled data set $S_P$;
(b) removing the data points in location handled data set $S_P$ from the requested data set;
(c) placing the remaining data points from the requested data set in density handled data set $S_D$;
(d) creating a table of N regionation levels and specifying the number of data points to be placed in each regionation level
(e) creating regionation levels 1 through N by repeating the following steps;
i. for any regionation level n where n is greater than 1, placing all the data points from the regionation level (n−1) into regionation level n;
ii. if any data points remain in location handled data set $S_P$, moving randomly chosen data points from location handled data set $S_P$ to regionation level n until the specified number of data points for regionation level n is reached, or no more data points are available in location handled data set $S_P$;
iii. if more data points are required to reach the specified number of data points in regionation level n, moving randomly chosen points from density handled data set $S_D$ to regionation level n until the specified number of data points for regionation level n is reached, or the process of adding data is terminated;

specifying the maximum number of data points to be displayed on screen;
determining the bounds of the geographic area displayed on screen;
determining the number of data points in each regionation level that fall within the bounds of the geographic area displayed on screen;
determining the regionation level N with the maximum number of data points that fall within the bounds of the geographic area displayed on screen wherein the number of data points in the regionation level is less than the specified the maximum number of data points to be displayed on screen;
displaying the data points in regionation level N on the screen and
adjusting the geographic bounds and the corresponding regionation level and displaying the corresponding data from the appropriate regionation level as the user pans and zooms the screen display.

10. A pattern-retaining method for displaying large volumes of geographic data points on a map providing displays at user controlled zoom levels that are representative of the data distribution and density using regionation data sets comprising:

determining the desired number of data cells;
retrieving a requested data set;
randomly selecting from the requested data set one data point from each cell that contains at least one data point to represent that cell and placing the selected data points in location handled data set $S_P$;
removing the data points in location handled data set $S_P$ from the requested data set;
placing the remaining data points from the requested data set in density handled data set $S_D$;
allocating data points from location handled data set $S_P$ and density handled data set $S_D$ to regionation levels using a random selection process;
specifying the maximum number of data points to be displayed on screen;
determining the bounds of the geographic area displayed on screen;
determining the number of data points in each regionation level that fall within the bounds of the geographic area displayed on screen;
determining the regionation level N with the maximum number of data points that fall within the bounds of the geographic area displayed on screen wherein the number of data points in the regionation level is less than the specified the maximum number of data points to be displayed on screen;

displaying the data points in regionation level N on the screen and adjusting the geographic bounds and the corresponding regionation level and displaying the corresponding data from the appropriate regionation level as the user pans and zooms the screen display.

11. The method of claim 10 wherein allocating data points from location handled data set $S_P$ and density handled data set $S_D$ to regionation levels further comprises:

creating a table of N regionation levels and specifying the number of data points to be placed in each regionation level and creating regionation levels 1 through N by repeating the following steps;
   i. for any regionation level n where n is greater than 1, placing all the data points from the regionation level (n−1) into regionation level n;
   ii. if any data points remain in location handled data set $S_P$, moving randomly chosen data points from location handled data set $S_P$ to regionation level n until the specified number of data points for regionation level n is reached, or no more data points are available in location handled data set $S_P$;
   iii. if more data points are required to reach the specified number of data points in regionation level n, moving randomly chosen points from density handled data set $S_D$ to regionation level n until the specified number of data points for regionation level n is reached, or the process of adding data is terminated.

12. The method of claim 11 wherein the process of adding data is terminated when no more data points remain in density handled data set $S_D$, and the maximum regionation level N is set to the current value of n.

13. The method of claim 11 wherein the process of adding data is terminated when the number of data points remaining in density handled data set $S_D$ is less than a predetermined percentage of the number of data points required in the next regionation level, all of those data points are moved to the next regionation level (n+1), and the maximum regionation level N is set to the current value of (n+1).

14. The method of claim 10 wherein allocating data points from location handled data set $S_P$ and density handled data set $S_D$ to regionation levels further comprises:

using an algorithm to specify the number of data points to be placed in each regionation level and creating regionation levels 1 through N by repeating the following steps;
   i. for any regionation level n where n is greater than 1, placing all the data points from the regionation level (n−1) into regionation level n;
   ii. if any data points remain in location handled data set $S_P$, moving randomly chosen data points from location handled data set $S_P$ to regionation level n until the specified number of data points for regionation level n is reached, or no more data points are available in location handled data set $S_P$;
   iii. if more data points are required to reach the specified number of data points in regionation level n, moving randomly chosen data points from density handled data set $S_D$ to regionation level n until the specified number of data points for regionation level n is reached, or the process of adding data is terminated.

15. The method of claim 14 wherein the process of adding data is terminated when no more data points remain in density handled data set $S_D$, and the maximum regionation level N is set to the current value of N.

16. The method of claim 14 wherein the process of adding data is terminated when the number of data points remaining in density handled data set $S_D$ is less than a predetermined percentage of the number of data points required in the next regionation level, all of those data points are moved to the next regionation level (n+1), and the maximum regionation level N is set to (n+1).

17. The method of claim 14 wherein the algorithm to specify the number of data points to be placed in each regionation level is that the number of data points in any regionation level greater than level 1 is double the number of data points in the previous regionation level.

18. The method of claim 14 wherein the algorithm to specify the number of data points to be placed in each regionation level is that the number of data points in any regionation level greater than level 1 is ten times the number of data points in the previous regionation level.

* * * * *